Jan. 1, 1929.
C. LE G. FORTESCUE
1,697,177
CREST VOLTMETER
Filed May 7, 1924
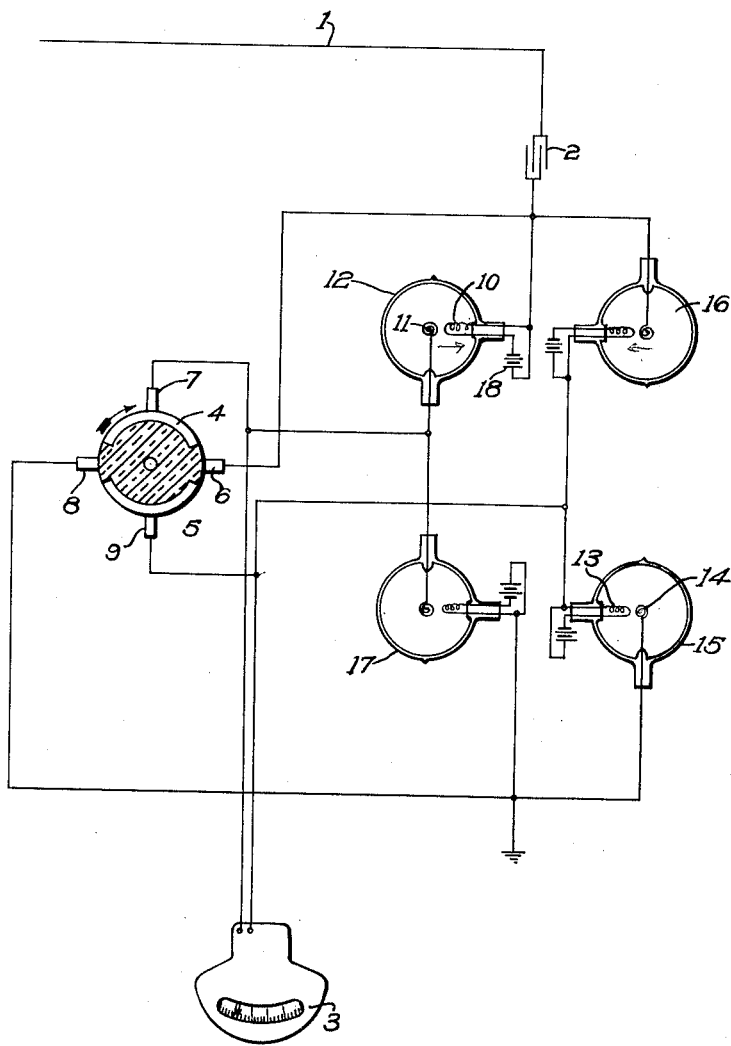
WITNESSES:
A. G. Schiefelbein
E. R. Evans
INVENTOR
Charles LeG. Fortescue.
BY
Wesley G. Carr
ATTORNEY Patented Jan. 1, 1929.

1,697,177

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

CREST VOLTMETER.

Application filed May 7, 1924. Serial No. 711,578.

My invention relates to electrical measuring devices for measuring maximum voltages, commonly termed crest voltmeters.

In my prior Patent, No. 1,186,765, dated June 13, 1916, I disclosed a method of measuring the maximum applied voltage of a circuit by measuring the average charging current of a capacity of known value. The present invention relates to an improvement upon the method disclosed in said patent.

The object of my invention is to provide an instrument of the class described that will measure voltages with a high degree of accuracy.

A synchronously rotating commutator or rectifying device was employed in the system disclosed in my prior patent. It has been found difficult to adjust the mechanical rectifying device to reverse the connections at exactly the right instant. This is the usual difficulty encountered in mechanical commutating arrangements but, in this case, unless the brushes of the rectifier are adjusted to exactly the right point, the reading of the current-measuring device will be too low. To correct this, it is necessary to adjust the rectifier brushes carefully, and considerable skill is required to obtain accurate readings.

It has been proposed to utilize rectifiers of the electro-ionic or the mercury-arc type in order to avoid the necessity of frequently adjusting the brushes. On account of the voltage drop through this type of rectifier, this system has had limited application. Furthermore, where certain harmonics are very prominent in the voltage wave to be measured, a slight inaccuracy is introduced by the use of these rectifiers.

According to my invention, a mechanical rectifier having an appreciable open-circuited interval is employed in conjunction with electro-ionic rectifiers. During the greater part of the cycle, the mechanical commutating device connects the ammeter in circuit with the condenser and, at the beginning and end of each half cycle, the electro-ionic rectifiers are utilized so that the meter will not be disconnected until the reversal of current actually takes place. By this arrangement, I obtain a voltage-measuring device that is not critical in adjustment and reads maximum voltages with a high degree of accuracy.

For a complete understanding of my invention, reference should be made to the accompanying drawing which discloses schematically a preferred embodiment thereof.

Let us assume that a variable potential is applied to the conductor 1 from some source (not shown) and it is desired to measure the maximum value of this potential. A condenser 2 is inserted in series between the conductor 1 and ground, and a meter 3 is connected to read the average charging current of the condenser. The connections of the meter 3 are reversed periodically, in accordance with the frequency of the voltage applied to the conductor 1, by a mechanical rectifier consisting of insulated segments 4 and 5 and contact brushes 6, 7, 8 and 9.

The commutator is driven synchronously in the direction indicated by the arrow and serves to connect the meter, during one-half cycle, through a circuit from the condenser 2 to brushes 6 and 7 and segment 4, the meter 3, and brushes 8 and 9 and segment 5 to ground. During the next half-cycle, a circuit is closed from condenser 2 through brushes 6 and 9 and segment 4, in the opposite direction through the meter 3, and brushes 7 and 8 and segment 5 to ground. Thus, a steady indication of the meter 3 is obtained in spite of the reversal of the potential applied to the condenser 2.

The commutator has appreciable open-circuited periods, due to the fact that the distance between the segments is greater than the width of the brushes, and, during these periods, a path for the charging current of condenser 2 is provided as follows:

During one-half cycle the path is through the hot cathode 10 and anode 11 of the electro-ionic device 12, the meter 3, the cathode 13 and the anode 14 of the electro-ionic device 15 to ground; during the next half cycle, a path is provided from condenser 2 through the anode and cathode of the electro-ionic device 16, in the opposite direction through the meter 3, and the anode and cathode of the electro-ionic device 17 to ground. The use of the electro-ionic rectifying devices 12, 15, 16 and 17 renders the close adjustment of the mechanical rectifier unnecessary.

The electro-ionic device 12, comprises a sealed container filled with mercury vapor, and an incandescent cathode energized by a battery 18 to maintain the mercury vapor ionized. It is not necessary to describe these devices in greater detail, as their construction is well known and the details of construction form no part of the present invention. Such rectifiers have a very low internal resistance, the voltage drop being in the neighborhood of four to twelve volts, depending on the current traversing the device.

The theory of operation is as follows:

The average charging current taken by the condenser is proportional to the capacity of the condenser, the frequency of the applied voltage and the maximum value of the voltage, or $$I\,Av = k\,C\,f\,E$$

Therefore, the maximum voltage E may be determined from the equation $$E = \frac{I\,Av}{k\,C\,f}$$

since $I\,Av$, $C$ and $f$ are known, and the value of the constant $k$ simply depends upon the system of units chosen to express the values of $I$, $C$ and $f$.

Obviously, for a given frequency $f$ and capacity $C$ the meter 3 may be calibrated to read actual volts.

It will be apparent that I have provided a method of measuring crest voltages to a high degree of accuracy which is relatively simple and does not require frequent or critical readjustment. The arrangement which I have described provides an accurate and reliable commercial instrument that may be operated by unskilled employés, which, so far as I am aware, cannot be said of any prior devices for the purpose.

I claim:

1. A crest voltmeter system comprising a condenser, a current-responsive device associated therewith, an asymmetric conducting device in series with said condenser, a synchronous commutator arranged to shunt said device periodically, and means for measuring the average condenser-charging current.

2. A crest voltmeter system comprising a condenser, a synchronous commutator in series with said condenser, said commutator having appreciable open-circuit periods, and auxiliary rectifying devices operative during said open-circuit periods.

3. A crest voltmeter system comprising a condenser, a synchronous commutator in series with said condenser, said commutator having appreciable open-circuit periods, an electro-ionic rectifier in series with said condenser and operative during said open-circuit periods, and means for measuring the average condenser charging current.

4. In combination, a condenser, a mechanical rectifying device, an electro-ionic rectifying device, both of said devices in series with said condenser, and a meter responsive to the condenser-charging current and connected across said rectifiers.

5. In combination, a circuit, a mechanical rectifying device, an electro-ionic rectifier in parallel therewith, and means including said rectifiers and a current-responsive indicating instrument for measuring the maximum value of a variable potential applied to said circuit.

In testimony whereof, I have hereunto subscribed my name this 28th day of April, 1924.

CHARLES LE G. FORTESCUE.